United States Patent
Milk et al.

(10) Patent No.: US 11,870,972 B2
(45) Date of Patent: Jan. 9, 2024

(54) METHODS, SYSTEMS AND DEVICES SUPPORTING REAL-TIME SHARED VIRTUAL REALITY ENVIRONMENT

(71) Applicant: Within Unlimited, Inc., Los Angeles, CA (US)

(72) Inventors: Chris Milk, Los Angeles, CA (US); Aaron Koblin, Venice, CA (US)

(73) Assignee: Within Unlimited, Inc., Venice, CA (US)

( * ) Notice: Subject to any disclaimer, the term of this patent is extended or adjusted under 35 U.S.C. 154(b) by 148 days.

(21) Appl. No.: 17/279,241

(22) PCT Filed: Sep. 30, 2019

(86) PCT No.: PCT/IB2019/058311
§ 371 (c)(1),
(2) Date: Mar. 24, 2021

(87) PCT Pub. No.: WO2020/070630
PCT Pub. Date: Apr. 9, 2020

(65) Prior Publication Data
US 2021/0409677 A1 Dec. 30, 2021

Related U.S. Application Data

(60) Provisional application No. 62/888,532, filed on Aug. 18, 2019, provisional application No. 62/747,237, (Continued)

(51) Int. Cl.
H04N 13/368 (2018.01)
G06T 7/194 (2017.01)
(Continued)

(52) U.S. Cl.
CPC .......... *H04N 13/368* (2018.05); *G06T 7/194* (2017.01); *H04N 13/111* (2018.05); *H04N 13/204* (2018.05); *H04N 2013/0081* (2013.01)

(58) Field of Classification Search
CPC .. H04N 13/368; H04N 13/111; H04N 13/204; H04N 2013/0081; G06T 7/194
See application file for complete search history.

(56) References Cited

U.S. PATENT DOCUMENTS 7,289,130 B1    10/2007  Satoh et al.
10,078,917 B1 *  9/2018  Gaeta ................. G06F 3/04815
(Continued)

FOREIGN PATENT DOCUMENTS

CN    107610041 A  *  1/2018  ............... G06T 3/00
KR   1020170143264 A    12/2017
(Continued)

OTHER PUBLICATIONS

WIPO, International Search Report received in International Application No. PCT/IB2019/058311, dated Feb. 18, 2020, (4p.).
(Continued)

*Primary Examiner* — Ryan R Yang
(74) *Attorney, Agent, or Firm* — McDermott Will & Emery LLP

(57) ABSTRACT

In a system in which a virtual reality (VR) user interacts with a virtual environment via a VR device, where the VR user is provided a view of the virtual environment via the VR device. A method includes tracking the VR user relative to at least one other user in a real-world environment; extracting an image of the VR user from the real-world environment; at least one other user obtaining information about the virtual environment; and presenting at least one other view corresponding to the VR user's virtual environment. Another view is presented as if seen from the location and/or
(Continued)

perspective and/or orientation of another device relative to the VR user in the real environment.

20 Claims, 7 Drawing Sheets

Related U.S. Application Data filed on Oct. 18, 2018, provisional application No. 62/740,252, filed on Oct. 2, 2018.

(51) Int. Cl.
*H04N 13/204* (2018.01)
*H04N 13/111* (2018.01)
*H04N 13/00* (2018.01)

(56) References Cited

U.S. PATENT DOCUMENTS

| | | | |
|---|---|---|---|
| 11,281,287 B2* | 3/2022 | Averyanov | G08G 5/0026 |
| 2016/0209658 A1 | 7/2016 | Zalewski | |
| 2016/0341959 A1 | 11/2016 | Gibbs et al. | |
| 2017/0269685 A1 | 9/2017 | Marks et al. | |
| 2017/0278304 A1 | 9/2017 | Hildreth et al. | |
| 2017/0280199 A1* | 9/2017 | Davies | H04N 21/8133 |
| 2018/0096519 A1 | 4/2018 | Tokubo | |
| 2018/0151000 A1 | 5/2018 | Liv | |
| 2021/0312150 A1* | 10/2021 | Nater | G06T 11/00 |

FOREIGN PATENT DOCUMENTS

| | | |
|---|---|---|
| WO | 2016120806 A1 | 8/2016 |
| WO | 2018089040 A1 | 5/2018 |

OTHER PUBLICATIONS

WIPO, International Written Opinion received in International Application No. PCT/IB2019/058311, dated Feb. 18, 2020, (8p.).
Zhu et al., "A Shared Augmented Virtual Environment for Real-Time Mixed Reality Applications," Wiley Online Library, May 17, 2018, pp. 1-14.
WIPO, Peer Search Report from European Patent Office (EPO), International Application No. PCT/IB2019/058311, dated Jan. 16, 2020, (13p.).
WIPO, Peer Search Report from China National Intellectual Property Administration (CNIPA), International Application No. PCT/IB2019/058311, dated Jan. 17, 2020, (9p.).
WIPO, Peer Search Report from Japan Patent Office (JPO), International Application No. PCT/IB2019/058311, dated Jan. 22, 2020, (8p.).
WIPO, Peer Search Report from U.S. Patent & Trademark Office (USPTO), International Application No. PCT/IB2019/058311, dated Jan. 8, 2020, (9p.).

* cited by examiner

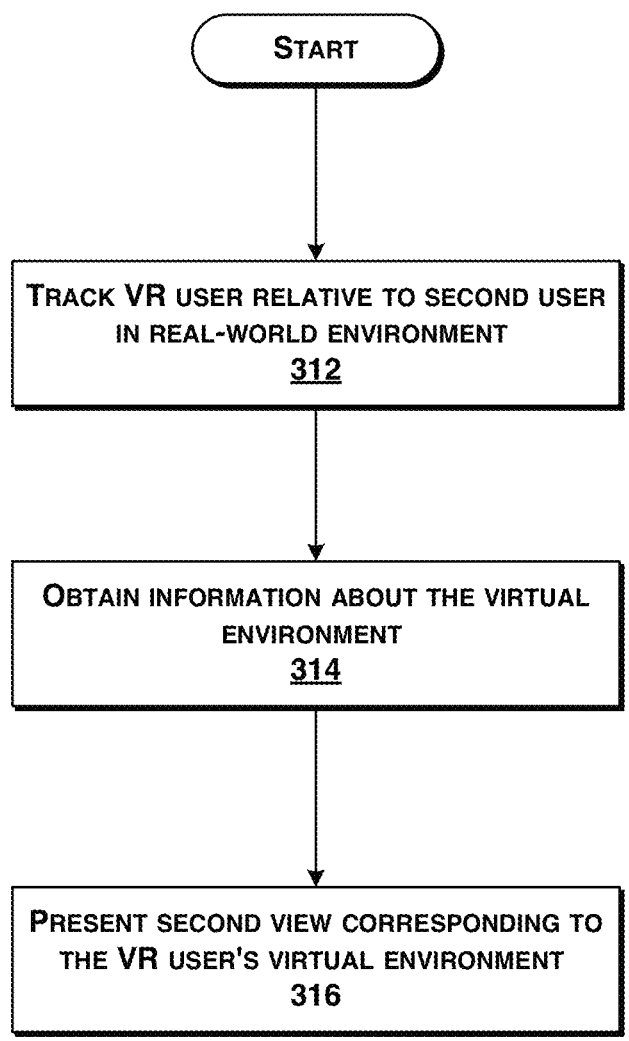

METHODS, SYSTEMS AND DEVICES SUPPORTING REAL-TIME SHARED VIRTUAL REALITY ENVIRONMENT

RELATED APPLICATIONS

This application is a National Stage (a 371) of International Application No. PCT/IB2019/058311, filed Sep. 30, 2019, the entire contents of which are hereby fully incorporated herein by reference for all purposes. PCT/IB2019/058311 claims the benefit of U.S. provisional patent applications: (i) 62/740,252, filed Oct. 2, 2018; (ii) 62/747,237, filed Oct. 18, 2018; and (iii) 62/888,532, filed Aug. 18, 2019, the entire contents of each of which are hereby fully incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to virtual reality (VR), and, more particularly, to methods, systems and devices supporting real-time shared VR environments.

BACKGROUND

Virtual and augmented reality devices allow a user to view and interact with virtual environments. A user may, effectively, immerse themselves in a non-real environment and interact with that environment. For example, a user may interact (e.g., play a game) in a virtual environment, where the user's real-world movements are translated to acts in the virtual world. Thus, e.g., a user may simulate tennis play in a virtual environment by their real-world movements.

A user may see a view of their virtual environment with a wearable VR/AR device such as a VR headset or AR glasses or the like. A representation of the VR user (e.g., an avatar) may be shown in the virtual environment to correspond to the VR user's location and/or movements. In some cases, the user's view of their virtual environment may be presented to others, e.g., on one or more external display devices. However, in such cases, the other user's see the same view of the VR user's virtual environment as the VR user themselves. In some such cases, the view provided to others is what the VR user sees, and may not include any representation of the user.

It is desirable, and an object of this invention, to provide others with views of the VR user's virtual environment, preferably with a corresponding view of a virtual representation of the VR user.

It is also desirable, and an object hereof, to provide others with different views of the VR user's virtual environment, not necessarily the same view as that of a VR user.

SUMMARY

The present invention is specified in the claims as well as in the below description. Preferred embodiments are particularly specified in the dependent claims and the description of various embodiments.

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions.

One general aspect includes a method, in a system in which a virtual reality (VR) user interacts with a virtual environment via a VR device, and in which the VR user is provided a view of the virtual environment via the VR device, the method including: (a) tracking the VR user relative to a second device in a real-world environment. The method may also include (b) extracting an image of the VR user from the real-world environment; and (c) obtaining information about the virtual environment. The method may also include (d) presenting, on the second device, a second view corresponding to the VR user's virtual environment, where the second view is based on the virtual environment and interactions of the VR user with the virtual environment, and where the second view is presented as if seen from a location and/or perspective and/or orientation of the second device relative to the VR user in the real-world environment. The second view may include a representation of the VR user.

Implementations of the described techniques may include hardware, a method or process, or computer software on a computer-accessible medium.

Implementations may include one or more of the following features:

The method where the extracting in (b) uses image segmentation to determine the image of the VR user.

The method where the image segmentation determines a pixel mask corresponding to the image of the VR user.

The method where the pixel mask is applied to a frame of a video comprising the VR user in the real-world environment.

The method where, further comprising producing a masked video frame comprising the VR user.

The method where extracting uses one or more depth maps.

The method where the second view includes an unaugmented representation of the VR user.

The method where the representation of the VR user is a virtual representation of the VR user.

The method where the representation of the VR user is an augmented representation of the VR user.

The method where the second device has at least one camera, and where the tracking uses the at least one camera.

The method where the second device includes a display, and wherein the presenting uses the display.

The method where the second device includes a display, and wherein the presenting uses said display.

The method where the second device is a tablet computer or a smartphone.

The method where the tracking in (A) uses one or more markers in the real-world environment.

The method where the second device communicates directly with the VR device, and wherein the second device obtains at least some information about the virtual environment from the VR device.

The method where the second device and the VR device communicate with a sharing system, and wherein the second device obtains at least some information about the virtual environment from the sharing system.

The method where the sharing system provides information in real time from the VR user's VR device and/or computing device to the second device.

The method where the second view of the VR user's virtual environment corresponds in real time to movements and/or gestures and/or positions of the VR user within that virtual environment.

The method where the second view corresponds in real time to a current state of the VR user's virtual environment.

The method where the second view is provided as a VR view or as an augmented view. The method, further comprising, a third virtual: (A1) tracking the VR user relative to the third virtual in a real environment; (B1) obtaining information about the virtual environment; and (C1) presenting a third view corresponding to the VR user's virtual environment, wherein the third view is based on the virtual environment and interactions of the VR user with the virtual environment, and wherein the third view is presented as if seen from a location and/or perspective and/or orientation of the third device relative to the VR user in the real environment.

The method where the third view includes a representation of the VR user.

The method where third device has at least one camera, and wherein the tracking in (A1) uses the at least one camera.

The method where the third device includes a display, and wherein the presenting in (C1) uses the display.

The method where the third device is a tablet computer or a smartphone.

The method where the tracking in (A1) uses one or more markers in the real-world environment.

The method where the third device communicates directly with the VR device, and wherein the third device obtains at least some information about the virtual environment from the VR device.

The method where the third device and the VR device communicate with the sharing system, and wherein the third device obtains at least some information about the virtual environment from the sharing system.

The method where the sharing system provides information in real time from the VR user's VR device and/or computing device to the third device.

The method where the third view of the VR user's virtual environment corresponds in real time to movements and/or gestures and/or positions of the VR user within that virtual environment.

The method where the third view corresponds in real time to a current state of the VR user's virtual environment.

The method where the third view is provided as a VR view or as an augmented view. The method, further comprising (D) recording and/or storing aspects of the second view. The method, further comprising (D1) recording and/or storing aspects of the third view. The method further comprising: (E) presenting at least some of the recorded and/or stored aspects of the second view. The method further comprising (E1) presenting at least some of the recorded and/or stored aspects of the second view.

The method where the second view excludes objects from the real-world environment that are visible to the second device.

The method where the second device is in a fixed location.

The method where the second device is movable along a fixed path.

The method where the second device is attached to a drone.

One general aspect includes method, in a system in which a virtual reality (VR) user interacts with a virtual environment via a VR device, and in which the VR user is provided a view of the virtual environment via the VR device, the method including (A) tracking the VR user relative to at least one other user in a real-world environment. The method may also include (B): the at least one device extracting an image of the VR user from the real-world environment, wherein said extracting uses one or more depth maps.

The method may also include: (C) the at least one other user obtaining information about the virtual environment. The method may also include (D) presenting, on at least one other device, at least one other view corresponding to the VR user's virtual environment, wherein each at least one other view is based on the virtual environment and the VR user's interactions with the virtual environment, and wherein each at least one other view is presented as if seen from a location and/or perspective and/or orientation of the corresponding at least one other user relative to the VR user in the real-world environment. And the method may include where the at least one other view includes a corresponding representation of the VR user.

Implementations may include one or more of the following features:

The method where at least one at least one other view includes a virtual representation of the VR user.

The method where at least one at least one other view comprises an unaugmented representation of the VR user.

The method where the representation of the VR user comprises a virtual representation of the VR user.

The method where at least one at least one other device has at least one camera, and wherein the tracking in (A) uses the at least one camera.

The method where at least one other device includes a display, and wherein the presenting uses the display.

The method where at least one at least one other device comprises a tablet computer or a smartphone.

The method where the tracking in (A) uses one or more markers in the real-world environment.

The method where at least one at least one other device communicates directly with the VR device, and wherein at least one at least one other device obtains at least some information about the virtual environment from the VR device.

The method where at least one at least one other device and the VR device communicate with a sharing system, and wherein at least one at least one other device obtains at least some information about the virtual environment from the sharing system.

The method where the sharing system provides information in real time from the VR user's VR device and/or computing device to the at least one at least one other device.

The method where at least one other view of the VR user's virtual environment corresponds in real time to movements and/or gestures and/or positions of the VR user within that virtual environment.

The method where at least one other view corresponds in real time to a current state of the VR user's virtual environment.

The method where at least one other view is provided as a VR view or as an augmented view.

One general aspect includes a device, including: (a) hardware including memory and at least one processor, and (b) a service running on said hardware, where said service is configured to perform the methods described and/or claimed herein.

One general aspect includes an article of manufacture including non-transitory computer-readable media having computer-readable instructions stored thereon, the computer readable instructions including instructions for implementing a computer-implemented method, said method operable on a device including hardware including memory and at least one processor and running a service on said hardware, said method including the method of any one of the method claims.

One general aspect includes a device, in a system in which a virtual reality (VR) user interacts with a virtual environment via a VR device, and in which the VR user is provided a view of the virtual environment via the VR device, said device constructed and adapted to (a) obtain information about the virtual environment and to (b) provide at least some of the information to one or more user devices.

Implementations may include one or more of the following features. The device as where the information about the virtual environment includes information about interaction of the VR user's with the virtual environment A skilled reader will understand that any method described above or below and/or claimed and described as a sequence of steps or acts is not restrictive in the sense of the order of steps or acts.

Below is a list of method or process embodiments. Those will be indicated with a letter "P". Whenever such embodiments are referred to, this will be done by referring to "P" embodiments.

P1. A method, in a system in which a virtual reality (VR) user interacts with a virtual environment via a VR device, and in which the VR user is provided a view of the virtual environment via the VR device, the method comprising:
(A) tracking the VR user relative to a second device in a real-world environment;
(B) extracting an image of the VR user from the real-world environment;
(C) obtaining information about the virtual environment; and
(D) presenting a second view corresponding to the VR user's virtual environment, wherein the second view is based on the virtual environment and interactions of the VR user with the virtual environment, and wherein the second view is presented as if seen from a location and/or perspective and/or orientation of the second device relative to the VR user in the real-world environment, wherein the second view includes a representation of the VR user.

P2. The method of embodiment P1, wherein the extracting in (B) uses image segmentation to determine the image of the VR user.

P3. The method of embodiment P2, wherein the image segmentation determines a pixel mask corresponding to the image of the VR user.

P4. The method of embodiments P2 or P3, wherein the pixel mask is applied to a frame of a video comprising the VR user in the real-world environment.

P5. The method of any of embodiments P2-P4, further comprising producing a masked video frame comprising the VR user.

P5A. The method of embodiment P1, wherein the extracting in (B) uses one or more depth maps.

P6. The method of any of the preceding embodiments, wherein the representation of the VR user comprises an unaugmented representation of the VR user.

P7. The method of any of the preceding embodiments, wherein the representation of the VR user comprises a virtual representation of the VR user.

P8. The method of any of the preceding embodiments, wherein the representation of the VR user comprises an augmented representation of the VR user.

P9. The method of any of the preceding embodiments, wherein the representation of the VR user comprises the extracted image or an image based thereon.

P10. The method of any of the preceding embodiments, wherein second device has at least one camera, and wherein the tracking uses said at least one camera.

P11. The method of any of embodiments P1-P10, wherein the second device has at least one camera, and wherein the depth maps are determined using said at least one camera.

P12. The method of any of the preceding embodiments, wherein the second device includes a display, and wherein the presenting uses said display.

P13. The method of any of the preceding embodiments, wherein the second device is a tablet computer or a smartphone.

P14. The method of any of the preceding embodiments, wherein the tracking in (A) uses one or more markers in the real-world environment.

P15. The method of any of the preceding embodiments, wherein the second device communicates directly with the VR device, and wherein the second device obtains at least some information about the virtual environment from the VR device.

P16. The method of any of the preceding embodiments, wherein the second device and the VR device communicate with a sharing system, and wherein the second device obtains at least some information about the virtual environment from the sharing system.

P17. The method of embodiment P16, wherein the sharing system provides information in real time from the VR user's VR device and/or computing device to the second device.

P18. The method of any of the preceding embodiments, wherein the second view of the VR user's virtual environment corresponds in real time to movements and/or gestures and/or positions of the VR user within that virtual environment.

P19. The method of any of the preceding embodiments, wherein the second view corresponds in real time to a current state of the VR user's virtual environment.

P20. The method of any of the preceding embodiments, wherein the second view is provided as a VR view or as an augmented view.

P21. The method of any of the preceding embodiments, wherein the second view excludes objects from the real-world environment that are visible to the second device.

P22. The method of any of the preceding embodiments, wherein the second device is in a fixed location.

P23. The method of any of the preceding embodiments, wherein the second device is movable along a fixed path.

P24. The method of any of embodiments P1-P20, wherein the second device is attached to a drone.

P25. The method of any of the preceding embodiments, further comprising, a third device:
(A1) tracking the VR user relative to the third device in a real environment;
(B1) extracting a second image of the VR user from the real-world environment;
(C1) obtaining information about the virtual environment; and
(D1) presenting a third view corresponding to the VR user's virtual environment, wherein the third view is based on the virtual environment and interactions of the VR user with the virtual environment, and wherein the third view is presented as if seen from a location and/or perspective and/or orientation of the third device relative to the VR user in the real environment.

P26. The method of embodiment P25, wherein the extracting in (B1) uses one or more depth maps determined by the third device.

P27. The method of embodiment P1, wherein the extracting in (B1) uses image segmentation to determine the second image of the VR user.

P28. The method of embodiment P27, wherein the image segmentation determines a pixel mask corresponding to the second image of the VR user.

P29. The method of embodiment P28, wherein the pixel mask is applied to a frame of a video comprising the VR user in the real-world environment.

P30. The method of any of embodiments P27 to P29, further comprising producing a masked video frame comprising the VR user.

P31. The method of embodiments P25 or P26, wherein the third view includes a second representation of the VR user.

P32. The method of embodiments P25 or P26, wherein the second representation of the VR user comprises the extracted image or an image based thereon.

P33. The method of embodiment P31, wherein the second representation of the VR user is a virtual representation of the VR user.

P34. The method of embodiment P31, wherein the second representation of the VR user is an augmented representation of the VR user.

P35. The method of any of embodiments P25 to P34, wherein third device has at least one camera, and wherein the tracking in (A1) uses said at least one camera.

P36. The method of any of embodiments P25 to P35, wherein the third device has at least one camera, and wherein the third device uses the at least one camera to determine depth maps.

P37. The method of any of embodiments P25 to P35, wherein the third device includes a display, and wherein the presenting in (C1) uses said display.

P38. The method of any of embodiments P25 to P37, wherein the third device is a tablet computer or a smartphone.

P39. The method of any of embodiments P25-P38, wherein the tracking in (A1) uses one or more markers in the real-world environment.

P40. The method of any of embodiments P25-P38, wherein the third device communicates directly with the VR device, and wherein the third device obtains at least some information about the virtual environment from the VR device.

P41. The method of any of embodiments P25-P38, wherein the third device and the VR device communicate with the sharing system, and wherein the third device obtains at least some information about the virtual environment from the sharing system.

P42. The method of embodiment P41, wherein the sharing system provides information in real time from the VR user's VR device and/or computing device to the third device.

P43. The method of any of embodiments P25 to P42, wherein the third view of the VR user's virtual environment corresponds in real time to movements and/or gestures and/or positions of the VR user within that virtual environment.

P44. The method of any of embodiments P25 to P43, wherein the third view corresponds in real time to a current state of the VR user's virtual environment.

P45. The method of any of embodiments P25-P44, wherein the third view is provided as a VR view or as an augmented view.

P46. The method of any of the preceding embodiments, further comprising:
(D) recording and/or storing aspects of the second view.

P47. The method of any of embodiments P25-P46, further comprising:
(D1) recording and/or storing aspects of the third view.

P48. The method of embodiment P46, further comprising:
(E) presenting at least some recorded and/or stored aspects of the second view.

P49. The method of any of embodiments P46-P48, further comprising:
(E1) presenting at least some recorded and/or stored aspects of the second view.

P50. A method, in a system in which a virtual reality (VR) user interacts with a virtual environment via a VR device, and in which the VR user is provided a view of the virtual environment via the VR device, the method comprising:
(A) tracking the VR user relative to at least one device in a real-world environment;
(B) said at least one device extracting an image of the VR user from the real-world environment, wherein said extracting uses one or more depth maps;
(C) said at least one device obtaining information about the virtual environment; and
(D) presenting at least one other view corresponding to the VR user's virtual environment, wherein each at least one other view is based on the virtual environment and interactions of the VR user with the virtual environment, and wherein each at least one other view is presented as if seen from a location and/or perspective and/or orientation of the corresponding at least one device relative to the VR user in the real-world environment, and
wherein the at least one other view includes a corresponding representation of the VR user.

P51. The method of embodiment P50, wherein at least one representation of the VR user comprises an extracted image of the VR user or an image based thereon.

P52. The method of embodiment P50, wherein the extracting in (B) uses image segmentation to determine the image of the VR user.

P53. The method of embodiment P51 or P52, wherein the image segmentation determines a pixel mask corresponding to the image of the VR user.

P54. The method of embodiment P53, wherein the pixel mask is applied to a frame of a video comprising the VR user in the real-world environment.

P55. The method of any of embodiments P52-P54, further comprising producing a masked video frame comprising the VR user.

P56. The method of embodiment P50, wherein at least one at least one other view comprises an unaugmented representation of the VR user.

P57. The method of embodiment P50, wherein the representation of the VR user comprises a virtual representation of the VR user.

P58. The method of any of embodiments P50 to P56, wherein at least one at least one other device has at least one camera, and wherein the tracking in (A) uses said at least one camera.

P59. The method of any of embodiments P50 to P57, wherein at least one at least one other device has at least one camera, and wherein the one or more depth maps are determined using the at least one camera.

P60. The method of any of embodiments P50-P57, wherein at least one other device includes a display, and wherein the presenting uses said display.

P61. The method of any of embodiments P50-P59, wherein at least one at least one other device comprises a tablet computer or a smartphone.

P62. The method of any of embodiments P50-P60, wherein the tracking in (A) uses one or more markers in the real-world environment.

P63. The method of any of embodiments P50-P61, wherein at least one at least one other device communicates directly with the VR device, and wherein at least one at least one other device obtains at least some information about the virtual environment from the VR device.

P64. The method of any of embodiments P50-P62, wherein at least one at least one other device and the VR device communicate with a sharing system, and wherein at least one at least one other device obtains at least some information about the virtual environment from the sharing system.

P65. The method of embodiment P64, wherein the sharing system provides information in real time from the VR user's VR device and/or computing device to the at least one at least one other device.

P66. The method of any of embodiments P50-P63, wherein at least one other view of the VR user's virtual environment corresponds in real time to movements and/or gestures and/or positions of the VR user within that virtual environment.

P67. The method of any of embodiments P50-P65, wherein at least one other view corresponds in real time to a current state of the VR user's virtual environment.

P68. The method of any of embodiments P50-P66, wherein at least one other view is provided as a VR view or as an augmented view.

Below is a list of device embodiments. Those will be indicated with a letter "D". Whenever such embodiments are referred to, this will be done by referring to "D" embodiments.

D69. A device, comprising:
(a) hardware including memory and at least one processor, and
(b) a service running on the hardware, wherein the service is configured to: perform the method of any one of the preceding method embodiments P1-P68.

D70. A device, in a system in which a virtual reality (VR) user interacts with a virtual environment via a VR device, and in which the VR user is provided a view of the virtual environment via the VR device, the device constructed and adapted to:
(a) obtain information about the virtual environment; and
(b) provide at least some of the information to one or more user devices.

D71. The device as in embodiment D70, wherein the information about the virtual environment includes information about interaction of the VR user's with the virtual environment.

Below is an article of manufacture embodiment, indicated with a letter "M".

M62. An article of manufacture comprising non-transitory computer-readable media having computer-readable instructions stored thereon, the computer readable instructions including instructions for implementing a computer-implemented method, the method operable on a device comprising hardware including memory and at least one processor and running a service on the hardware, the method comprising the method of any one of the preceding method embodiments P1-P68.

The above features, along with additional details of the invention, are described further in the examples herein, which are intended to further illustrate the invention but are not intended to limit its scope in any way.

BRIEF DESCRIPTION OF THE DRAWINGS

Objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 3B-3C are flowcharts of exemplary aspects hereof; and

DETAILED DESCRIPTION OF THE PRESENTLY PREFERRED EXEMPLARY EMBODIMENTS

Glossary and Abbreviations

As used herein, unless used otherwise, the following terms or abbreviations have the following meanings:

"AR" means augmented reality.

"VR" means virtual reality.

A "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

DESCRIPTION

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

It will be appreciated that variations to the foregoing embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Figure 1A:
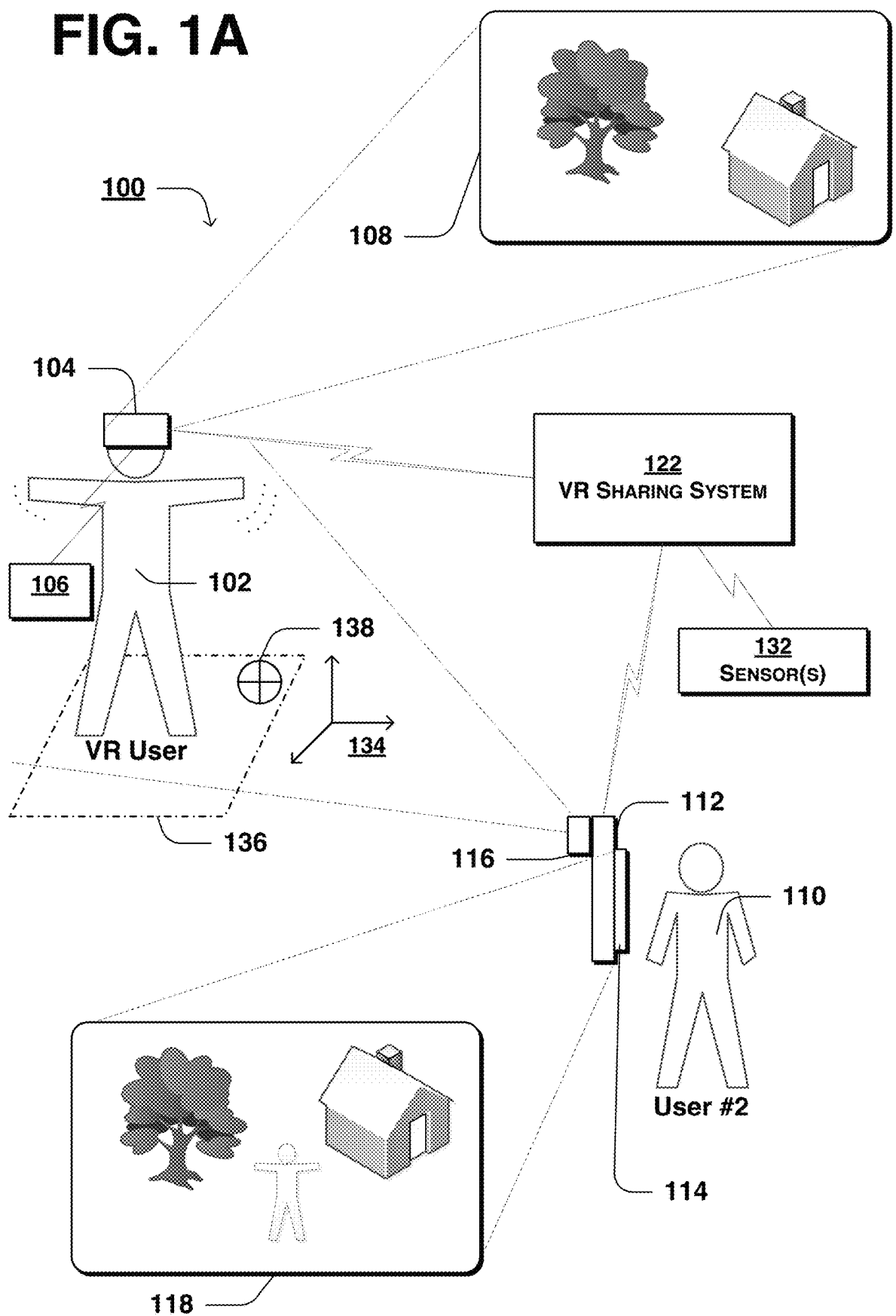
FIGS. 1A-1B depict aspects of a shared virtual reality system according to exemplary embodiments hereof.

A system supporting a real-time shared virtual reality environment 100 is described now with reference now to FIG. 1A, in which a first person (VR user) 102 uses a VR device 104 (e.g., VR headset) to view and interact with a virtual environment. The VR device 104 may be connected (wired and/or wirelessly) to a computing device 106 (e.g., a personal computer, smartphone, etc.). Sensors in the VR device 104 and possibly other sensors may track the VR user's movements (e.g., head movements, hand movements/gestures, etc.) and those movements may cause corresponding changes/interactions in the virtual environment. The VR device 104 presents the VR user with a view 108 corresponding to that VR user's virtual environment.

A second user 110 has a device 112 that includes a display 114 and at least one camera 116. The second user 110 may use their camera(s) 116 to view the VR user 102 (as shown by the dashed lines in the drawing). Based on the position of the second user 110 relative to the VR user 102, the display 114 of the second user's device 112 may display The device 112 may comprise or be connected to a computer system (e.g., the device 112 may be a tablet computer, a smartphone, etc.)

Figure 1B:
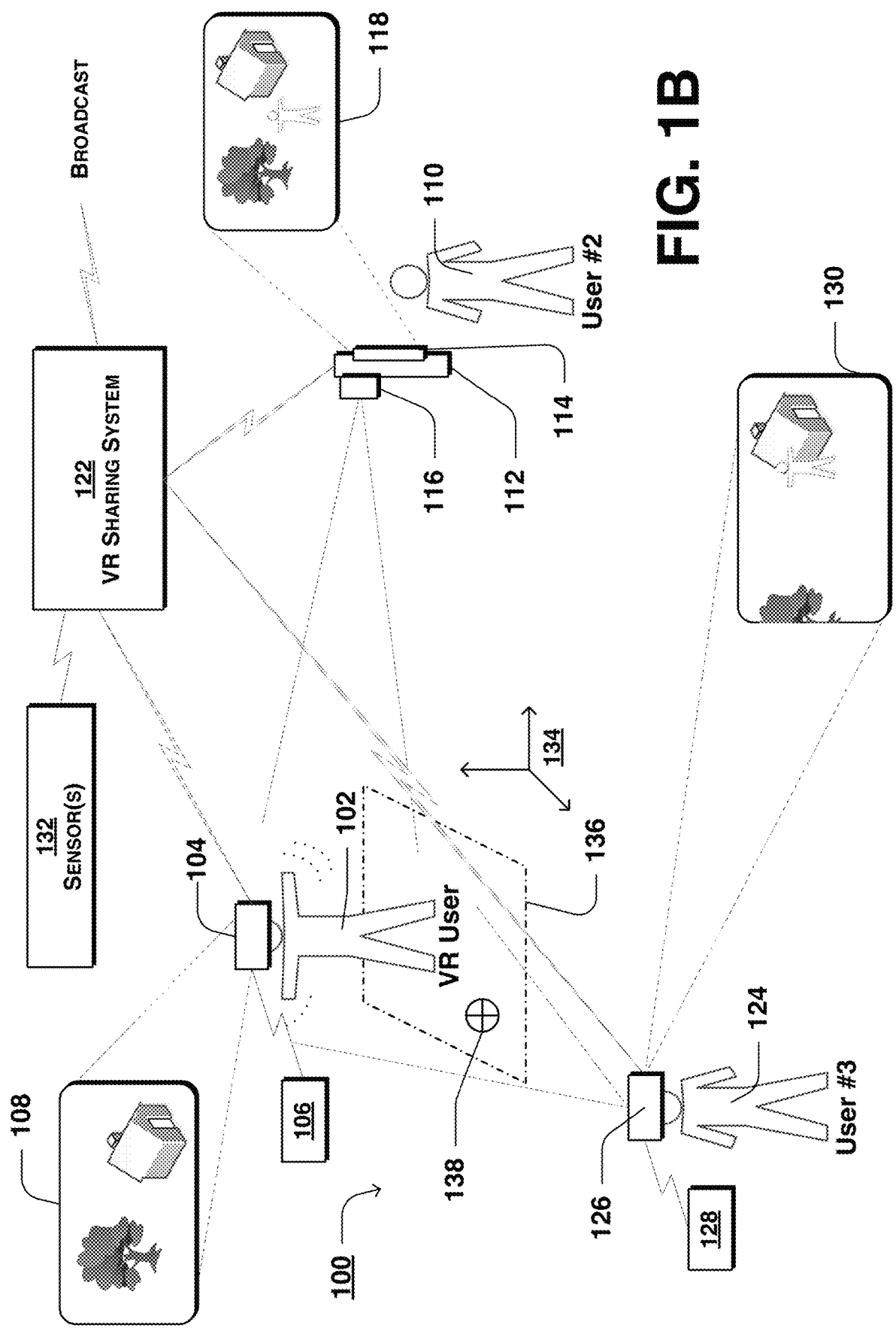

Preferably, the view 118 of the VR user's virtual environment is shown as if seen from the location, perspective, and orientation of the second user 110 relative to the VR user 102. Thus, e.g., in FIG. 1A, since the second user 110 is not viewing the virtual environment from exact same location as the VR user 102, the second user 110 may not see the same parts of the virtual environment. This notion is represented in FIGS. 1A-1B by the users having different views of the virtual environment. In the example in FIG. 1B, the view 130 of user #3 124 includes a representation of another person 105. This other person may be a virtual person (e.g., part of the virtual environment) or another real-person VR user (not shown in the drawings).

Preferably the second user's view 118 of the VR user's virtual environment corresponds in real time to the movement(s)/gesture(s)/position of the VR user 102 within that virtual environment. In other words, the second user's view 118 preferably corresponds in real time to the current state of the VR user's virtual environment.

The second user's view 118 may be provided as a VR view or as an augmented view.

The VR user's VR device 104 and/or their computing device 106 may connect directly with the second user's device 112 in order to share information (e.g., information about the virtual environment and/or the VR user's current view of that environment). The devices may also or instead communicate via a VR sharing system 122.

The VR sharing system 122 may comprise a computer system constructed and adapted to provide information from the VR user's VR device 104 and/or their computing device 106 to one or more other users.

In the example in FIG. 1A, the VR sharing system 122 provides information in real time from the VR user's VR device 104 and/or their computing device 106 to the second user 110. In the example in FIG. 1B, the VR sharing system 122 provides information in real time from the VR user's VR device 104 and/or their computing device 106 to two other users (the second user 110 and a third user 124). Note that the third user 124 is shown using a VR headset device 126. However, in some embodiments it is generally necessary for each other user (the non-VR users) to have a device that can capture a real-time view of the VR user. The third user's VR headset device 126 may be a standalone device or it may be connected (wired and/or wirelessly) to a computing device 128. The third user 124 may have a view 130 of the VR user's virtual environment, where the view 130 may include a representation of the VR user, and where the view 130 is preferably of the VR user's environment from the point of view of the third user 124.

It is also generally necessary for the system to know the relative position of each other user (each user other than VR user 102) to the VR user 102. The position of each user (including the VR user 102) may be determined using sensors in the user's respective devices and/or external sensor(s) 132 (e.g., cameras or the like) connected to the VR sharing system 112. Using the sensor(s) 132 (alone or in combination with other information), the VR sharing system 112 may determine the position of each user (including the VR user) within a known spatial/coordinate system 134, and thereby determine the other user's relative positions to the VR user. These relative positions may be used to determine the other user's views of the VR user's virtual environment.

The devices of the users other than VR user 102 (e.g., user #2 and user #3 in FIG. 1B) are preferably in synch with the VR user's environment, and the representations of the VR user in the VR views of the users other than VR user 102 (e.g., views 118 and 130 in FIG. 1B) are preferably in synch with the VR user's actual position/gestures/movements as well as the respective viewing positions of the non-VR users relative to the VR user.

Although only two other users (i.e., two users other than the VR user 102) are shown in FIG. 1B, those of ordinary skill in the art will appreciate and understand, upon reading this description, that a system/environment 100 according to exemplary embodiments hereof may support multiple other users, including multiple other VR users.

In addition, the virtual view(s) determined by one or more particular other users (e.g., user #2 in FIGS. 1A-1B and/or user #3 in FIG. 1B) may be presented on more than one display and may be provided (in real-time or with delay) to multiple other users and/or locations, e.g., for broadcast or the like. The virtual view(s) determined by one or more particular other users (e.g., user #2 in FIGS. 1A-1B and/or user #3 in FIG. 1B) may be stored and/or recorded for later broadcast and/or display.

The multiple other users may be at one or more remote locations and may view, e.g., by television and/or computer system.

Although the description and drawings show one or more other users and their corresponding devices, those of ordinary skill in the art will realize and appreciate, upon reading this description, that those devices may be machine controlled and/or automated and/or remotely controlled. The devices may be in fixed locations and/or movable along fixed or arbitrary paths (e.g., using drones or the like). The devices may be at any height and/or location and/or orientation that may provide a view of the VR user(s).

The storing and broadcasting of the various views may be performed by the VR sharing system 122, as shown, e.g., in FIG. 1B.

Devices

Figure 2:
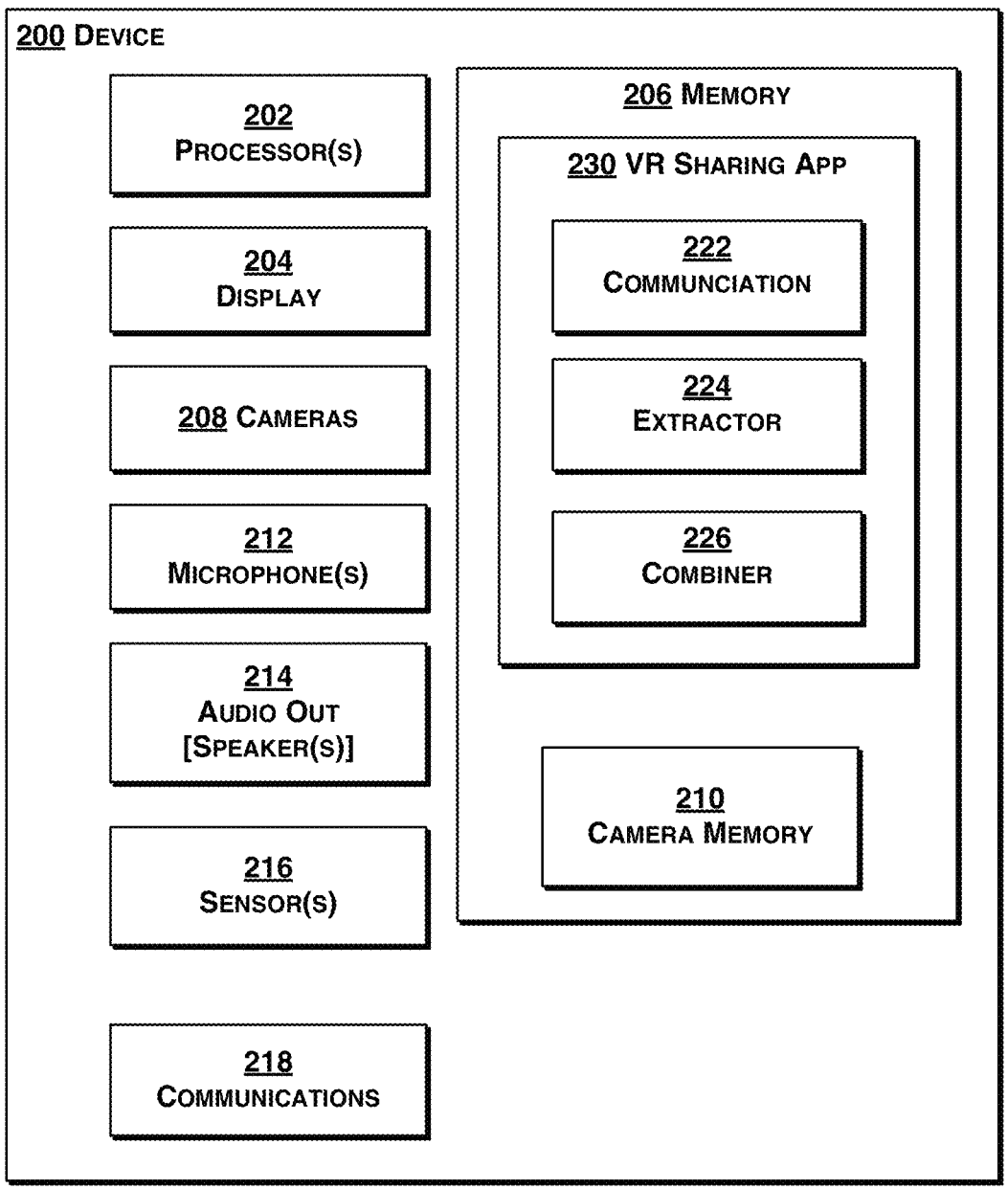
FIG. 2 depicts aspects of a user device according to exemplary embodiments hereof.

With reference now to FIG. 2, a device 200 (such as device 112 and/or 126/128 shown in FIGS. 1A-1B) are described according to exemplary embodiments hereof.

Device 200 may include one or more processors 202, display 204 (corresponding, e.g., to screen/display 114 of device 112), and memory 206. Various programs (including, e.g., the device's operating system as well as so-called applications or apps) may be stored in the memory 206 for execution by the processor(s) 202 on the device 200.

The memory may include random access memory (RAM), caches, read only storage (e.g., ROMs, etc.). As should be appreciated, the device 200 (even if in the form of a smartphone or the like) is essentially a computing device (described in greater detail below).

The device 200 may include at least one camera 208, preferably including one or more front cameras. The cameras may be capable of capturing real time view images (still or video) of objects in their respective fields of view. The front cameras may correspond to camera(s) 116 in device 112.

The memory 206 may include camera memory 210 provided or allocated for specific use by the camera(s). The camera memory 210 may be special purpose high-speed memory (e.g., high-speed frame buffer memory or the like).

The device 200 may also include one or more microphones 212 to pick up sound around the device and one or more speakers 214 to play audio sound on the device. The device may also support connection (e.g., wireless, such as Bluetooth, or wired, via jacks) of external microphones and speakers (e.g., integrated into a headset).

The device may include one or more sensors 216 (e.g., accelerometers, gyroscopes, etc.) and possibly an autonomous geo-spatial positioning module to determine conditions of the device such as movement, orientation, location, etc. The geo-spatial positioning module may access one or more satellite systems that provide autonomous geo-spatial positioning, and may include, e.g., the GPS (Global Positioning System), GLONASS, Galileo, Beidou, and other regional systems.

The device preferably includes one or more communications mechanisms 218, supporting, e.g., cellular, WiFi, Bluetooth and other communications protocols. For example, if the device 200 is a cell phone, then the communications mechanisms 218 may include multiple protocol-specific chips or the like supporting various cellular protocols. In this manner, as is known, the device may communicate with other devices via one or more networks (e.g., via the Internet, a cellular network, a LAN, a WAN, a satellite connection, etc.).

In some exemplary embodiments, devices may communicate directly with each other, e.g., using an RF (radio frequency) protocol such as WiFi, Bluetooth, Zigbee, or the like.

As depicted in FIG. 2, the device may include a VR sharing mechanism that may be or comprise a VR sharing App 220 that may be loaded and run on device 220. The VR sharing App 220 may generally be loaded into the memory 206 of the device 200 and may run by the processor(s) 202 and other components of device 200.

An exemplary VR sharing App 220 may include one or more of the following mechanisms:

1. Communication mechanism(s) 222
2. Extractor mechanism(s) 224
3. Combiner mechanism(s) 226

This list of mechanisms is exemplary, and is not intended to limit the scope of the invention in any way. Those of ordinary skill in the art will appreciate and understand, upon reading this description, that the VR sharing App 220 may include any other types of mechanisms, and/or general or other capabilities that may be required for the VR sharing App 220 to generally perform its functionalities as described in this specification. In addition, as should be appreciated, embodiments or implementations of the VR sharing App 220 need not include all of the mechanisms listed, and that some or all of the mechanisms may be optional.

The mechanisms are enumerated above to provide a logical description herein. Those of ordinary skill in the art will appreciate and understand, upon reading this description, that different and/or other logical organizations of the mechanisms may be used and are contemplated herein. It should also be appreciated that, while shown as separate mechanisms, various of the mechanisms may be implemented together (e.g., in the same hardware and/or software). As should also be appreciated, the drawing in FIG. 2 shows a logical view of exemplary aspects of the device, omitting connections between the components.

In operation, the VR sharing App 220 may use each mechanism individually or in combination with other mechanisms. When not in use, a particular mechanism may remain idle until such time its functionality may be required by the VR sharing App 220. Then, when the VR sharing App 220 may require its functionality, the VR sharing App 220 may engage or invoke the mechanism accordingly.

Figure 3A:
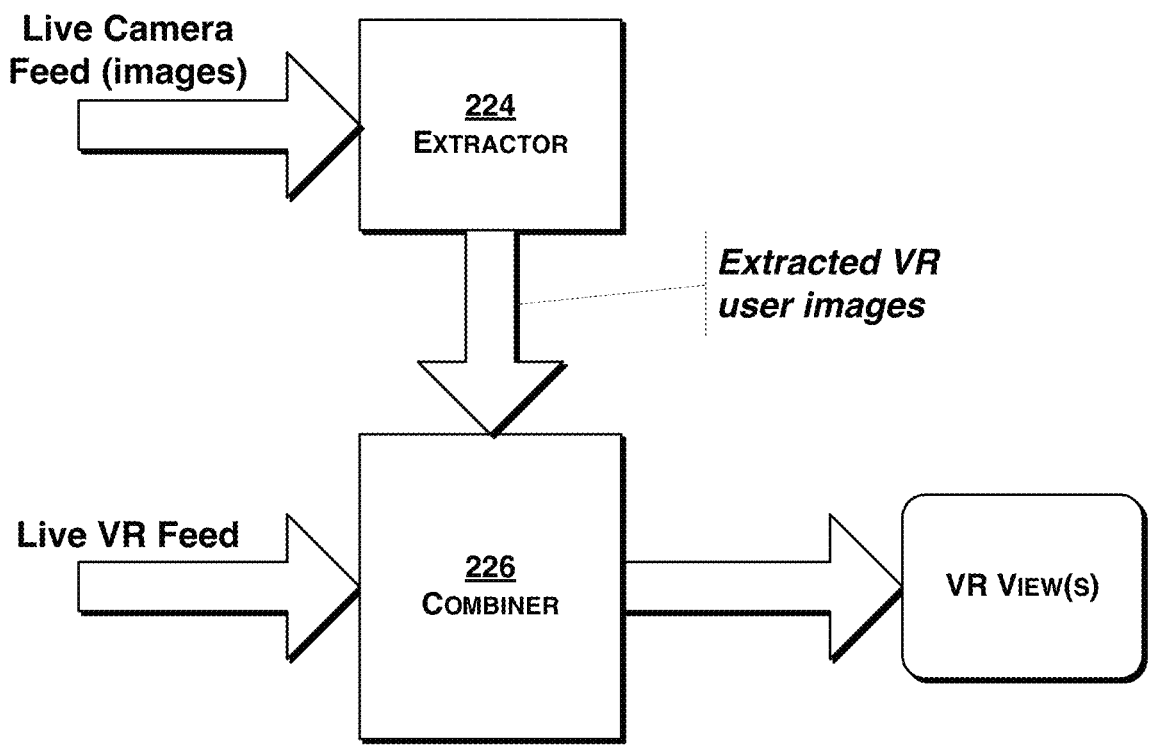
FIG. 3A depicts aspects of a VR sharing system according to exemplary embodiments hereof.

FIG. 3A shows the logical interaction between the extractor mechanism(s) 224 and the combiner mechanism(s) 226. As shown in FIG. 3A, the device 200 receives a live camera feed from its camera(s). These images may include the VR user. The extractor mechanism(s) 224 extract the VR user from their real-world background.

In some exemplary embodiments hereof the extractor mechanism(s) 224 may use machine learning (ML) techniques to extract the VR user from their real-world background.

Thus, e.g., the extractor mechanism(s) 224 may be trained by providing a system training application a dataset of known images. Each training image in the training dataset may include known content, preferably curated with human participation and/or intervention. In this way, the system may be trained to recognize a person (or persons) in an image. The recognized person (or persons) in an image may be used to determine a mask that can be used to extract the recognized person(s) from the image.

Exemplary embodiments hereof may use semantic segmentation to determine which portion(s) of an image correspond to the VR user. An implementation uses Google's DeepLab Semantic Segmentation service (hereinafter "DeepLab"). DeepLab is a machine learning model designed by Google to perform the semantic segmentation and mask generation. Given an input image, DeepLab may be used to generate a mask that describes the category for each pixel. DeepLab may be used by the extractor mechanism(s) 224 to generate a mask corresponding to a person or persons in an image. Amazon's SageMaker service is a platform which can be used to productize DeepLab by exposing a web-based interface to DeepLab, provisioning servers to run DeepLab, connecting input and output channels, etc.

Once the mask(s) have been determined for an image, the portion(s) of the image corresponding to the mask(s) may be extracted.

Figure 3B:
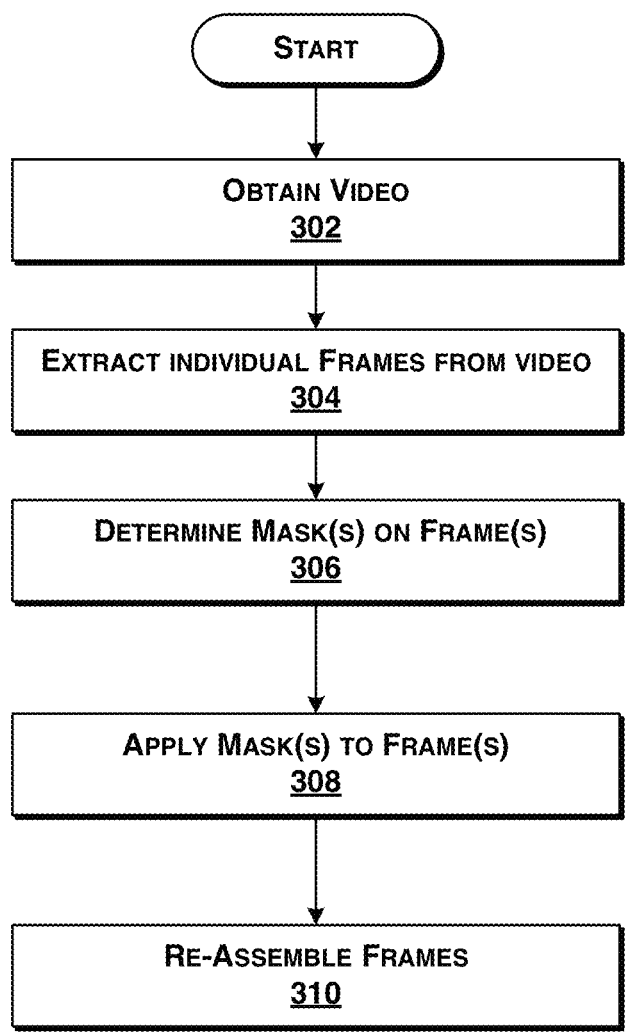

With reference to FIG. 3B, the extractor mechanism(s) 224 may obtain video content (at 302) and extract individual frames from the video content (at 304). The video content may, e.g., be in MPEG format and software such as FFMPEG (available from https://ffmpeg.org) may be used to convert the video stream into individual frames in PNG (Portable Graphics Format) format.

The individual frames may then be run through a Semantic Segmentation process (e.g., Amazon's DeepLab Semantic Segmentation service) (at 306) to determine one or more masks corresponding to the VR user. The mask(s) (determined at 306) may then be used to extract the portion(s) of the images corresponding to the VR user (at 308), and the resulting images (containing only the VR user) may be re-assembled (at 310) to form a video stream containing only the VR user.

The re-assembled video stream may be transcoded (e.g., to a different format from the original input video stream). In some cases the frame rate of the re-assembled stream may be modified (e.g., to 25 fps).

Recall that each user (other than the VR user) preferably has a view of the VR user 102. However, that view will be of the VR user 102 in their real-world environment. It is desirable to extract the VR user's image information from that real-world environment in order to obtain a view of substantially only the VR user. This extraction may be performed by the extractor mechanism(s) 224 using a known technique (e.g., depth extraction, so-called green screen, etc.). However, in preferred embodiments, the extraction may use depth maps to extract the VR user from their real-world background.

In some exemplary embodiments hereof, the device of the non-VR user's (e.g., user #2 or user #3 in FIG. 1A) may already have capability to perform the extraction, in which case the extractor mechanism(s) 224 may use or augment the native capabilities of the device. The extractor mechanism(s) 224 may use depth-sensing capabilities of the mobile device 112 (e.g., a mobile phone such as a dual camera iPhone or the like). Although a green screen or the like may also (or instead) be used by the extractor mechanism(s) 224, preferred embodiments use depth maps without a green screen. Although determining depth maps using a 2-camera device may be a preferably approach, those of ordinary skill in the art will realize and appreciate, upon reading this description, that depth maps may also be determine with a one-camera device that mapped the room, e.g., using Apple's AR kit (ARKit) or the like.

The extractor mechanism(s) 224 then provide (in real-time) the extracted VR user image(s) to the combiner mechanism(s) 226. The combiner mechanism(s) 226 are receiving a live real-time feed of the VR user's virtual reality environment. The combiner mechanism(s) 226 combine the VR user images (extracted by the extractor mechanism(s) 224) with the combiner mechanism(s) 226 to produce a VR view of the VR user's VR environment with a representation of the VR user. The representation of the VR user may, e.g., be the extracted image or an image based thereon. For example, in some cases, the representation of the VR user may be an unaugmented version of the extracted video image.

In some other cases, the representation of the VR user may be an augmented version of the extracted image. And in some other cases, the representation of the VR user may be an avatar or the like. In all cases, the representation of the VR user preferably tracks the actual VR user. Thus, with reference again to FIGS. 1A-1B, the image 103 representing the VR user 102 may be an unaugmented version of the extracted video image of the VR user, or an augmented version of that image, or an avatar or the like. The VR user 102 is shown in the drawings in FIGS. 1A-1B having a star on their torso. This star is merely a convenience to aid in distinguishing the various users in the drawings.

As should be appreciated, since the VR user may be moving, the output of the extractor mechanism(s) 224 preferably reflects that movement, and, similarly, the output of the combiner mechanism(s) 226 preferably reflects that movement. Thus, the representation of the VR user in the VR environment produced by the combiner preferably represents, in real time, the real-world movements of the VR user. In addition, since the other users (e.g., user #2 and/or user #3 in FIG. 1B) may also move relative to the VR user, the VR environment produced by the combiner preferably comports, in real time, to their relative positions or movements.

In some embodiments, the VR user may be positioned on or near one or more registration markers or the like to aid synchronization of the virtual and real worlds. Some embodiments may use a floor mat or the like (e.g., mat 136 with one or more markers 138) as registration marker(s) to help synchronize the virtual and real worlds.

FIG. 3C is a flowchart of exemplary aspects hereof. As shown in FIG. 3C, in some aspects, embodiments hereof provide a method, in a system in which a virtual reality (VR) user interacts with a virtual environment via a VR device, and in which the VR user is provided a view of the virtual environment via the VR device. The method may include (A) tracking the VR user relative to a second user in a real-world environment (at 312); (B) obtaining information about the virtual environment (at 314); and (C) presenting, on a second device, a second view corresponding to the VR user's virtual environment (at 316), wherein the second view is based on the virtual environment and interactions of the VR user with the virtual environment, and wherein the second view is presented as if seen from a location and/or perspective and/or orientation of the second user relative to the VR user in the real-world environment.

Thus, e.g., when a user (e.g., user #2 or user #3) obtains extracted video images of a VR user, the video images of that person (the VR user) may then be appropriately composited into the background of the video of the VR environment they are seeing in their headset (from the angle from which the mobile device is looking at them).

Real Time

Those of ordinary skill in the art will realize and understand, upon reading this description, that, as used herein, the term "real time" means near real time or sufficiently real time. It should be appreciated that there are inherent delays in electronic components and in network-based communication (e.g., based on network traffic and distances), and these delays may cause delays in data reaching various components. Inherent delays in the system do not change the real time nature of the data. In some cases, the term "real time data" may refer to data obtained in sufficient time to make the data useful for its intended purpose.

Although the term "real time" may be used here, it should be appreciated that the system is not limited by this term or by how much time is actually taken. In some cases, real-time computation may refer to an online computation, i.e., a computation that produces its answer(s) as data arrive, and generally keeps up with continuously arriving data. The term "online" computation is compared to an "offline" or "batch" computation.

Computing

The applications, services, mechanisms, operations, and acts shown and described above are implemented, at least in part, by software running on one or more computers.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 4:
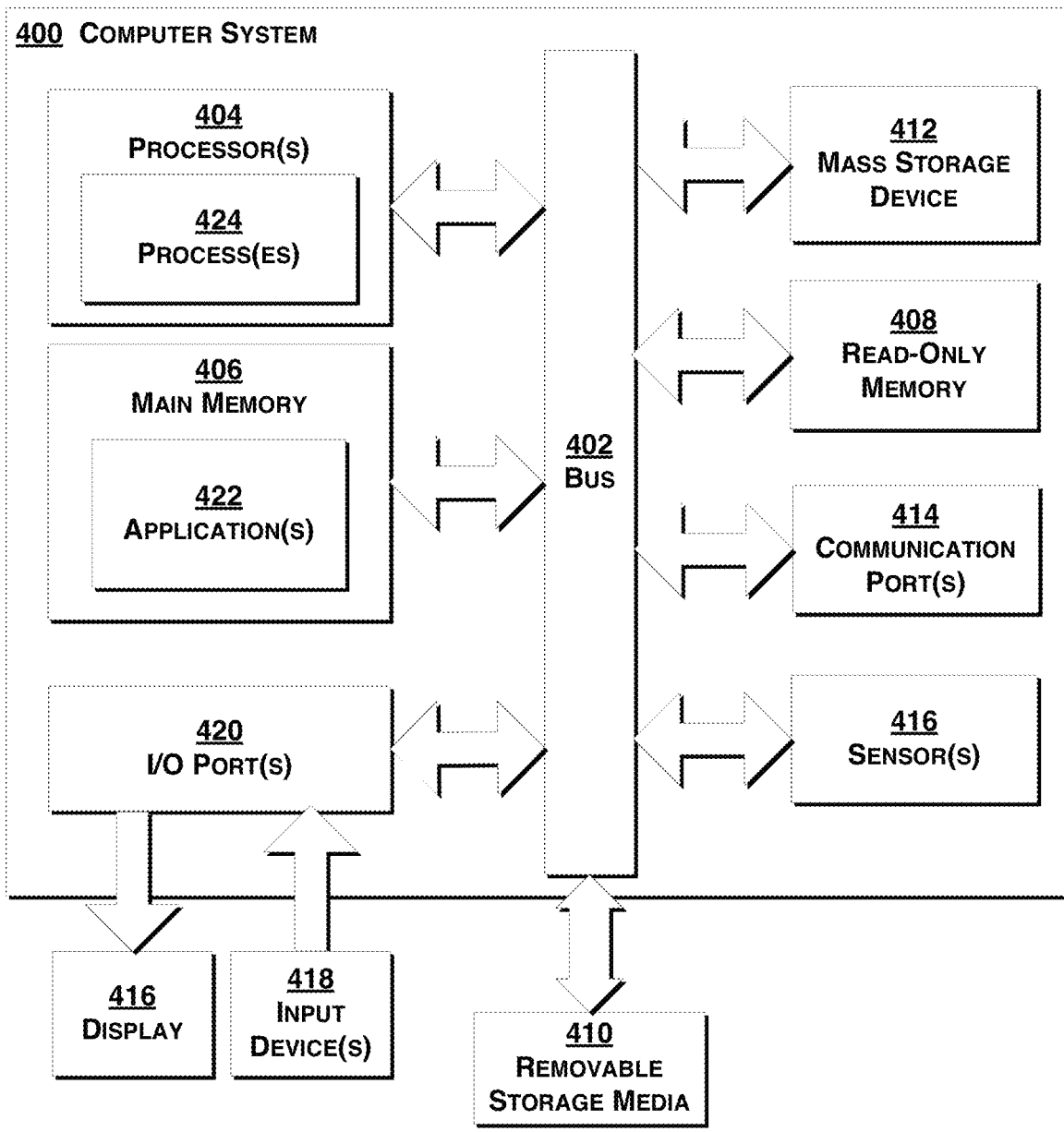
FIG. 4 is a logical block diagram depicting aspects of a computer system.

FIG. 4 is a schematic diagram of a computer system 400 upon which embodiments of the present disclosure may be implemented and carried out.

According to the present example, the computer system 400 includes a bus 402 (i.e., interconnect), one or more processors 404, a main memory 406, read-only memory 408, removable storage media 410, mass storage 412, and one or more communications ports 414. Communication port(s) 414 may be connected to one or more networks (not shown) by way of which the computer system 400 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 404 can be any known processor, such as, but not limited to, an Intel® Itanium® or Itanium 2® processor(s), AMD® Opteron® or Athlon MP® processor(s), or Motorola® lines of processors, and the like. Communications port(s) 414 can be any of an Ethernet port, a Gigabit port using copper or fiber, or a USB port, and the like. Communications port(s) 414 may be chosen depending on a network such as a Local Area Network (LAN), a Wide Area Network (WAN), or any network to which the computer system 400 connects. The computer system 400 may be in communication with peripheral devices (e.g., display screen 416, input device(s) 418) via Input/Output (I/O) port 420.

Main memory 406 can be Random Access Memory (RAM), or any other dynamic storage device(s) commonly known in the art. Read-only memory (ROM) 408 can be any static storage device(s) such as Programmable Read-Only Memory (PROM) chips for storing static information such as instructions for processor(s) 404. Mass storage 412 can be used to store information and instructions. For example, hard disk drives, an optical disc, an array of disks such as Redundant Array of Independent Disks (RAID), or any other mass storage devices may be used.

Bus 402 communicatively couples processor(s) 404 with the other memory, storage and communications blocks. Bus 402 can be a PCI/PCI-X, SCSI, a Universal Serial Bus (USB) based system bus (or other) depending on the storage devices used, and the like. Removable storage media 410 can be any kind of external storage, including hard-drives, floppy drives, USB drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 406 is encoded with application(s) 422 that support(s) the functionality as discussed herein (the application(s) 422 may be an application(s) that provides some or all of the functionality of the services/mechanisms described herein, e.g., VR sharing application 230, FIG. 2). Application(s) 422 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 404 accesses main memory 406 via the use of bus 402 in order to launch, run, execute, interpret or otherwise perform the logic instructions of the application(s) 422. Execution of application(s) 422 produces processing functionality of the service related to the application(s). In other words, the process(es) 424 represent one or more portions of the application(s) 422 performing within or upon the processor(s) 404 in the computer system 400.

For example, process(es) 424 may include an AR application process corresponding to VR sharing application 230.

It should be noted that, in addition to the process(es) 424 that carries(carry) out operations as discussed herein, other embodiments herein include the application(s) 422 itself (i.e., the un-executed or non-performing logic instructions and/or data). The application(s) 422 may be stored on a computer readable medium (e.g., a repository) such as a disk or in an optical medium. According to other embodiments, the application(s) 422 can also be stored in a memory type system such as in firmware, read only memory (ROM), or, as in this example, as executable code within the main memory 406 (e.g., within Random Access Memory or RAM). For example, application(s) 422 may also be stored in removable storage media 410, read-only memory 408, and/or mass storage device 412.

Those skilled in the art will understand that the computer system 400 can include other processes and/or software and hardware components, such as an operating system that controls allocation and use of hardware resources. As shown in FIG. 2, the device 200 (a computer system) may include one or more sensors 216, and in the examples in FIGS. 1A-1B, the VR sharing system 122 may include one or more sensors 132.

As discussed herein, embodiments of the present invention include various steps or acts or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Although embodiments hereof are described using an integrated device (e.g., a smartphone), those of ordinary skill in the art will appreciate and understand, upon reading this description, that the approaches described herein may be used on any computing device that includes a display and at least one camera that can capture a real-time video image of a user. For example, the system may be integrated into a heads-up display of a car or the like. In such cases, the rear camera may be omitted.

CONCLUSION

As used herein, including in the claims, the phrase "at least some" means "one or more," and includes the case of only one. Thus, e.g., the phrase "at least some ABCs" means "one or more ABCs", and includes the case of only one ABC.

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "corresponds to" means "corresponds in part to" or "corresponds, at least in part, to," and is not exclusive. Thus, e.g., the phrase "corresponds to factor X" means "corresponds in part to factor X" or "corresponds, at least in part, to factor X." Unless specifically stated by use of the word "only," the phrase "corresponds to X" does not mean "corresponds only to X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

Reference numerals have just been referred to for reasons of quicker understanding and are not intended to limit the scope of the present invention in any manner.

Thus is provided an augmented reality system that combines a live view of a real-world, physical environment with imagery based on live images from one or more other devices.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A method, in a system in which a virtual reality (VR) user interacts with a virtual environment via a VR device, and in which the VR user is provided a view of the virtual environment via the VR device, the method comprising:
    (A) tracking the VR user relative to a second device in a real-world environment;
    (B) extracting an image of the VR user from the real-world environment, wherein the extracting is performed by the second device and uses one or more depth maps determined and/or obtained by the second device and using at least one camera in the second device;
    (C) obtaining information about the virtual environment; and
    (D) presenting a second view corresponding to the VR user's virtual environment, wherein the second view is based on the virtual environment and interactions of the VR user with the virtual environment, and wherein the second view is presented as if seen from a location and/or perspective and/or orientation of the second device relative to the VR user in the real-world environment,
    wherein the second view includes a representation of the VR user, and
    wherein the representation of the VR user comprises the image of the VR user extracted in (B) or an image based thereon.

2. The method of claim 1, wherein the image of the VR user is extracted from the real-world environment in (B), independent of a background or background color in the real-world environment.

3. The method of claim 1, wherein the representation of the VR user comprises an unaugmented representation or a virtual representation or an augmented representation of the VR user.

4. The method of claim 1, wherein the tracking uses said at least one camera of the second device.

5. The method of claim 1, wherein the second device is a tablet computer or a smartphone.

6. The method of claim 1, wherein the second device communicates directly with the VR device, and wherein the second device obtains at least some information about the virtual environment from the VR device.

7. The method of claim 1, wherein the second device and the VR device communicate with a sharing system, and wherein the second device obtains at least some information about the virtual environment from the sharing system.

8. The method of claim 7, wherein the sharing system provides information in real time from the VR user's VR device and/or computing device to the second device.

9. The method of claim 1, wherein the second view of the VR user's virtual environment corresponds in real time to movements and/or gestures and/or positions of the VR user within the VR user's virtual environment.

10. The method of claim 1, wherein the second view corresponds in real time to a current state of the VR user's virtual environment, and wherein the second view is provided as a VR view or as an augmented view.

11. The method of claim 1, wherein the second device is in a fixed location or movable along a fixed path.

12. The method of claim 1, wherein the second device is attached to a drone.

13. The method of claim 1, further comprising a third device:
    (A1) tracking the VR user relative to the third device in the real-world environment;
    (B1) extracting a second image of the VR user from the real-world environment, wherein the extracting in (B1) is performed by the third device and uses second one or more depth maps determined by the third device, wherein the third device has a second at least one camera, and wherein the third device uses the second at least one camera to determine and/or obtain said second one or more depth maps;
    (C1) obtaining information about the virtual environment; and
    (D1) presenting a third view corresponding to the VR user's virtual environment, wherein the third view is based on the virtual environment and one or more interactions of the VR user with the virtual environment, and wherein the third view is presented as if seen from a location and/or perspective and/or orientation of the third device relative to the VR user in the real environment.

14. The method of claim 13, further comprising:
    (E1) recording and/or storing aspects of the third view.

15. The method of claim 14, further comprising:
    (E2) presenting at least some recorded and/or stored aspects of the second view.

16. The method of claim 1, further comprising:

(E) recording and/or storing aspects of the second view.

17. The method of claim 16, further comprising:

(E) presenting at least some recorded and/or stored aspects of the second view.

18. A device, comprising:

(a) hardware, including memory and at least one processor, and (b) a service running on said hardware, wherein said service is configured to:

perform the method of claim 1.

19. An article of manufacture comprising non-transitory computer-readable media having computer-readable instructions stored thereon, the computer-readable instructions including instructions for implementing a computer-implemented method, said method operable on a device comprising hardware including memory and at least one processor and running a service on said hardware, said method comprising the method of claim 1.

20. A method, in a system in which a virtual reality (VR) user interacts with a virtual environment via a VR device, and in which the VR user is provided a view of the virtual environment via the VR device, the method comprising:

(A) tracking the VR user relative to a second device in a real-world environment;

(B) extracting an image of the VR user from the real-world environment, wherein the extracting is performed by the second device and uses one or more depth maps determined and/or obtained by the second device and using at least one camera in the second device;

(C) obtaining information about the virtual environment;

(D) presenting a second view corresponding to the VR user's virtual environment, wherein the second view is based on the virtual environment and interactions of the VR user with the virtual environment, and wherein the second view is presented as if seen from a location and/or perspective and/or orientation of the second device relative to the VR user in the real-world environment; and (E) recording and/or storing aspects of the second view, wherein the second view includes a representation of the VR user, and wherein the representation of the VR user comprises the image of the VR user extracted in (B) or an image based thereon, wherein the image of the VR user is extracted from the real-world environment in (B), independent of a background or background color in the real-world environment, and wherein the representation of the VR user comprises an unaugmented representation or a virtual representation or an augmented representation of the VR user.

* * * * *